(12) United States Patent
Parsheh et al.

(10) Patent No.: US 8,752,329 B2
(45) Date of Patent: Jun. 17, 2014

(54) OPTIMIZATION OF CIRCULATION OF FLUID IN AN ALGAE CULTIVATION POND

(75) Inventors: Mehran Parsheh, Castro Valley, CA (US); Guido Radaelli, San Carlos, CA (US)

(73) Assignee: Aurora Algae, Inc., Hayward, CA (US)

( * ) Notice: Subject to any disclaimer, the term of this patent is extended or adjusted under 35 U.S.C. 154(b) by 103 days.

(21) Appl. No.: 13/098,338

(22) Filed: Apr. 29, 2011

(65) Prior Publication Data

US 2012/0272574 A1 Nov. 1, 2012

(51) Int. Cl.
*A01G 31/02* (2006.01)

(52) U.S. Cl.
USPC .......................................... 47/62 R

(58) Field of Classification Search
USPC ........... 119/62 R, 1.4, 59 R, 64, 59 S, 60–61, 119/62 A, 62 C, 62 N, 62 E, 63; 47/62 R, 1.4, 47/59 R, 64, 59 S, 60–61, 62 A, 62 C, 62 N, 47/62 E, 63
See application file for complete search history.

(56) References Cited

U.S. PATENT DOCUMENTS

| | | |
|---|---|---|
| 1,926,780 A | 9/1933 | Lippincott |
| 3,220,706 A | 11/1965 | Valdespino |
| 3,468,057 A | 9/1969 | Buisson et al. |
| 3,897,000 A | 7/1975 | Mandt |
| 3,955,318 A | 5/1976 | Hulls |
| 4,003,337 A | 1/1977 | Moore |
| 4,115,949 A | 9/1978 | Avron et al. |
| 4,217,728 A | 8/1980 | Shimamatsu et al. |
| 4,267,038 A | 5/1981 | Thompson |
| 4,365,938 A | 12/1982 | Warinner |
| 4,535,060 A | 8/1985 | Comai |
| 4,658,757 A | 4/1987 | Cook |
| 4,813,611 A | 3/1989 | Fontana |
| 5,105,085 A | 4/1992 | McGuire et al. |
| 5,130,242 A | 7/1992 | Barclay |
| 5,227,360 A | 7/1993 | Sherba et al. |
| 5,338,673 A | 8/1994 | Thepenier et al. |
| 5,353,745 A | 10/1994 | Fahs, II |
| 5,478,208 A | 12/1995 | Kasai et al. |

(Continued)

FOREIGN PATENT DOCUMENTS

| | | |
|---|---|---|
| CN | 102164492 A1 | 8/2011 |
| CN | 102348793 A1 | 2/2012 |

(Continued)

OTHER PUBLICATIONS

Dodd, "Elements of pond design and construction." CRC Handbook of microalgal mass culture, Richmond, ed., Boca Raton, Fl.: CRC Press, 1986, p. 265-283, see entire document, especially Fig. 1; p. 268, para 3 to p. 269, para 1; p. 270, para 1.*

(Continued)

*Primary Examiner* — Monica Williams
*Assistant Examiner* — Joshua Huson
(74) *Attorney, Agent, or Firm* — Carr & Ferrell LLP (57) ABSTRACT

Provided herein are exemplary algae cultivation ponds having the circulation of fluid optimized for such factors as decreased energy consumption, decreased predators/competitors, decreased or eliminated flow dead zones (i.e., stagnant regions), and increased algae biomass production, such as for the production of biofuels and other algae-based products.

20 Claims, 11 Drawing Sheets

(56) References Cited

U.S. PATENT DOCUMENTS

| | | |
|---|---|---|
| 5,518,990 A | 5/1996 | Ushio et al. |
| 5,527,456 A | 6/1996 | Jensen |
| 5,539,133 A | 7/1996 | Kohn et al. |
| 5,564,630 A | 10/1996 | Giles et al. |
| 5,573,669 A | 11/1996 | Jensen |
| 5,658,076 A | 8/1997 | Crump et al. |
| 5,658,767 A | 8/1997 | Kyle |
| 5,823,781 A | 10/1998 | Hitchcock et al. |
| 5,871,952 A | 2/1999 | Ghirardi et al. |
| 6,000,551 A | 12/1999 | Kanel et al. |
| 6,117,313 A | 9/2000 | Goldman et al. |
| 6,166,231 A | 12/2000 | Hoeksema |
| 6,192,833 B1 | 2/2001 | Brune et al. |
| 6,372,460 B1 | 4/2002 | Gladue et al. |
| 6,447,681 B1* | 9/2002 | Carlberg et al. ............ 210/602 |
| 6,524,486 B2 | 2/2003 | Borodyanski et al. |
| 6,579,714 B1 | 6/2003 | Hirabayashi et al. |
| 6,626,738 B1 | 9/2003 | Shank |
| 6,736,572 B2 | 5/2004 | Geraghty |
| 6,750,048 B2 | 6/2004 | Ruecker et al. |
| 6,831,040 B1 | 12/2004 | Unkefer et al. |
| 6,871,195 B2 | 3/2005 | Ryan et al. |
| 6,896,804 B2 | 5/2005 | Haerther et al. |
| 6,944,013 B2 | 9/2005 | Yang |
| 7,333,195 B2 | 2/2008 | Krei.beta et al. |
| 7,381,326 B2 | 6/2008 | Haddas |
| 7,391,608 B2 | 6/2008 | Tsai |
| 7,669,780 B2 | 3/2010 | Sugano et al. |
| 7,682,821 B2 | 3/2010 | Woods et al. |
| 7,748,650 B1 | 7/2010 | Sloan |
| 7,770,322 B2 | 8/2010 | Huntley et al. |
| 8,143,051 B2 | 3/2012 | Weissman et al. |
| 8,507,254 B1 | 8/2013 | Abuhasel |
| 2002/0105855 A1 | 8/2002 | Behnke et al. |
| 2003/0038566 A1 | 2/2003 | Qiu |
| 2003/0116502 A1 | 6/2003 | DeBusk et al. |
| 2003/0140021 A1 | 7/2003 | Ryan et al. |
| 2003/0199490 A1 | 10/2003 | Antoni-Zimmermann et al. |
| 2004/0121447 A1 | 6/2004 | Fournier |
| 2004/0161364 A1 | 8/2004 | Carlson |
| 2004/0262219 A1 | 12/2004 | Jensen |
| 2005/0064577 A1 | 3/2005 | Berzin |
| 2005/0095569 A1 | 5/2005 | Franklin |
| 2005/0164192 A1 | 7/2005 | Graham et al. |
| 2005/0170479 A1 | 8/2005 | Weaver et al. |
| 2005/0181345 A1 | 8/2005 | Bradbury et al. |
| 2005/0260553 A1 | 11/2005 | Berzin |
| 2005/0273885 A1 | 12/2005 | Singh et al. |
| 2006/0031087 A1 | 2/2006 | Fox et al. |
| 2006/0044259 A1 | 3/2006 | Hotelling et al. |
| 2006/0045750 A1 | 3/2006 | Stiles |
| 2006/0122410 A1 | 6/2006 | Fichtali et al. |
| 2006/0155558 A1 | 7/2006 | Corpening |
| 2006/0166243 A1 | 7/2006 | Su et al. |
| 2006/0192690 A1 | 8/2006 | Philipp |
| 2007/0115626 A1 | 5/2007 | Peng et al. |
| 2007/0155006 A1* | 7/2007 | Levin ........................ 435/292.1 |
| 2007/0289206 A1 | 12/2007 | Kertz |
| 2008/0118964 A1 | 5/2008 | Huntley et al. |
| 2008/0120749 A1 | 5/2008 | Melis et al. |
| 2008/0155888 A1 | 7/2008 | Vick et al. |
| 2008/0155890 A1* | 7/2008 | Oyler .............................. 47/1.4 |
| 2008/0160488 A1 | 7/2008 | Younkes et al. |
| 2008/0160591 A1 | 7/2008 | Willson et al. |
| 2008/0160593 A1 | 7/2008 | Oyler |
| 2008/0220486 A1 | 9/2008 | Weiss |
| 2008/0293132 A1 | 11/2008 | Goldman et al. |
| 2009/0011492 A1 | 1/2009 | Berzin |
| 2009/0029445 A1 | 1/2009 | Eckelberry et al. |
| 2009/0061928 A1 | 3/2009 | Lee et al. |
| 2009/0126265 A1 | 5/2009 | Rasmussen et al. |
| 2009/0137031 A1 | 5/2009 | Hirabayashi |
| 2009/0148931 A1 | 6/2009 | Wilkerson et al. |
| 2009/0151241 A1 | 6/2009 | Dressler et al. |
| 2009/0162919 A1 | 6/2009 | Radaelli et al. |
| 2009/0186860 A1 | 7/2009 | Huff et al. |
| 2009/0234146 A1 | 9/2009 | Cooney et al. |
| 2009/0319338 A1 | 12/2009 | Parks et al. |
| 2009/0325270 A1 | 12/2009 | Vick et al. |
| 2010/0022393 A1 | 1/2010 | Vick |
| 2010/0068772 A1 | 3/2010 | Downey |
| 2010/0100520 A1 | 4/2010 | Dargue et al. |
| 2010/0170149 A1* | 7/2010 | Keeler et al. .................... 47/1.4 |
| 2010/0170150 A1 | 7/2010 | Walsh, Jr. |
| 2010/0183744 A1 | 7/2010 | Weissman et al. |
| 2010/0196995 A1 | 8/2010 | Weissman et al. |
| 2010/0198659 A1 | 8/2010 | Meltzer et al. |
| 2010/0210003 A1* | 8/2010 | King et al. ................ 435/257.1 |
| 2010/0257781 A1 | 10/2010 | Batty et al. |
| 2010/0260618 A1 | 10/2010 | Parsheh et al. |
| 2010/0261922 A1 | 10/2010 | Fleischer et al. |
| 2010/0314324 A1 | 12/2010 | Rice et al. |
| 2010/0323387 A1 | 12/2010 | Bailey et al. |
| 2010/0325948 A1 | 12/2010 | Parsheh et al. |
| 2010/0327077 A1 | 12/2010 | Parsheh et al. |
| 2011/0016773 A1* | 1/2011 | Nichols et al. .................. 44/307 |
| 2011/0023360 A1 | 2/2011 | Ryan et al. |
| 2011/0051354 A1 | 3/2011 | Fan et al. |
| 2011/0136212 A1* | 6/2011 | Parsheh et al. ............ 435/257.1 |
| 2011/0197306 A1 | 8/2011 | Bailey et al. |
| 2011/0258915 A1 | 10/2011 | Subhadra |
| 2011/0287531 A1* | 11/2011 | Hazlebeck ................ 435/289.1 |
| 2011/0287544 A1 | 11/2011 | Berzin et al. |
| 2012/0252104 A1* | 10/2012 | Waibel et al. ............. 435/257.1 |
| 2013/0130909 A1 | 5/2013 | Vick et al. |

FOREIGN PATENT DOCUMENTS

| | | |
|---|---|---|
| CN | 102459585 A1 | 5/2012 |
| CN | 102575221 A1 | 7/2012 |
| EP | 2427551 A1 | 3/2012 |
| HK | 1168381 A1 | 12/2012 |
| IN | Journal52/2012 A1 | 12/2012 |
| IN | Journal12/2013 A1 | 3/2013 |
| IN | Journal20/2013 A1 | 5/2013 |
| IN | Journal37/2013 A1 | 9/2013 |
| JP | 09173050 A | 7/1997 |
| MX | 20110000934 A1 | 7/2011 |
| MX | 2011008222 A1 | 1/2012 |
| WO | WO2004106238 A2 | 12/2004 |
| WO | WO2009037683 A1 | 3/2009 |
| WO | WO2009149519 A1 | 12/2009 |
| WO | WO2010008490 A1 | 1/2010 |
| WO | WO2010011335 A1 | 1/2010 |
| WO | WO2010090760 A1 | 8/2010 |
| WO | WO2010129041 A1 | 11/2010 |
| WO | WO2010147648 A1 | 12/2010 |
| WO | WO2011002487 A1 | 1/2011 |
| WO | WO2012149214 A1 | 11/2012 |
| WO | WO2012170737 A1 | 12/2012 |

OTHER PUBLICATIONS

Santin-Montanya, I. "Optimal Growth of *Dunaliella primolecta* in Axenic Conditions to Assay Herbicides," Chemosphere, 66, Elsevier 2006, p. 1315-1322.

Felix, R. "Use of the cell wall-less alga *Dunaliella bioculata* in herbicide screening tests," Annals of Applied Biology, 113, 1988, pp. 55-60.

Janssen, M. "Phytosynthetic efficiency of *Dunaliella tertiolecta* under short light/dark cycles," Enzyme and Microbial Technology, 29, 2001, p. 298-305.

Saenz, M.E., "Effects of Technical Grade and a Commercial Formulation of Glyphosate on Algal Population Growth," Bulletin of Environmental Contamination Toxicology, 1997, 59: pates 638-644.

Christy et al., "Effects of Glyphosate on Growth of *Chlorella*," Weed Science, vol. 29, Issue 1, Jan. 1981, pp. 5-7.

Roessler et al., "Genetic Engineering Approaches for Enhanced Production of Biodiesel Fuel from Microalgae," ACS Symposium Series; American Chemical Society, 1994, pp. 255-270.

Grima et al. "Recovery of Microalgal Biomass in Metabolites: Process Options and Economics," Biotechnology Advances 20, 2003, pp. 491-515.

(56) References Cited

OTHER PUBLICATIONS

Knuckey et al. "Production of Microalgal Concentrates by Flocculation and their Assessment as Aquaculture Feeds," Aquacultural Engineering 35, 2006, pp. 300-313.
Applying [online] retrieved from: http://www.merriam-webster.com/dictionary/applying, on May 21, 2011; 3 pages.
Cohen, "Chemicals from MicroAlgae", 1999, CRC Press, pp. 49 and 51.
Kureshy et al., "Effect of Ozone Treatment on Cultures of *Nannochloropsis oculata, Isochrysis galbana*, and *Chaetoceros gracilis*," Journal of the World Aquaculture Society, 1999, 30(4), pp. 473-480.
Liao et al. "An Overview of Live Feeds Production System Design in Taiwan," Rotifer and Microalgae Culture Systems, Proceedings of a US-Asia Workshop, Honolulu, HI, 1991, pp. 135-150.
Kanematsu et al., "Methods to Repress the Growth of a *Nannochloropsis*-Grazing Microflagellate," Nippon Suisan Gakkaishi 55, 1989, pp. 1349-1352 (English Translation).
Csogor et al., "Light Distribution in a Novel Photobioreactor-Modelling for Optimization," Journal of Applied Phycology, vol. 13, pp. 325-333.
Janssen et al., "Enclosed Outdoor Photobioreactors: Light Regime, Photosynthetic Efficiency, Scale-Up, and Future Prospects," Biotechnology and Bioengineering, vol. 81, No. 2, pp. 193-210, Jan. 2003.
Zittelli et al., "Mass Cultivation of *Nannochloropsis* Sp. in Annular Reactors," Journal of Applied Phycology, vol. 15, pp. 107-113, Mar. 2003.
Strzepek et al., "Photosynthetic Architecture Differs in Coastal and Oceanic Diatoms," Nature, vol. 431, pp. 689-692, Oct. 2004.
Lee et al., "Isolation and Characterization of a Xanthophyll Aberrant Mutant of the Green Alga *Nannochloropsis oculata*," Marine Biotechnology, 2006, vol. 8, pp. 238-245.
NCBI entry EE109892 (Jul. 2006) [Retrieved from the Internet on Oct. 19, 2009, <http://www.ncbi.nlm.nih.gov/nucest/EE109892?ordinalops=1&itool=EntrezSystem2.Pentrez.Sequence.Sequence_ResultsPanel.Sequence_RVDocSum>].
Berberoglu et al., "Radiation Characteristics of *Chlamydomonas reinhardtii* CC125 and its truncated chlorophyll antenna transformants tla1, tlaX, and tla1-CW+," International Journal of Hydrogen Energy, 2008, vol. 33, pp. 6467-6483.
Ghirardi et al., "Photochemical Apparatus Organization in the Thylakoid Membrane of *Hordeum vulgare* wild type and chlorophyll b-less chlorina f2 mutant," Biochimica et Biophysica Act (BBA)—Bioenergetics, vol. 851, Issue 3, Oct. 1986, pp. 331-339 (abstract only).
Steinitz et al., "A mutant of the cyanobacterium *Plectonema boryanum* resistant to photooxidation," Plant Science Letters, vol. 16, Issues 2-3, 1979, pp. 327-335 (abstract only).
Koller et al., "Light Intensity During Leaf Growth Affects Chlorophyll Concentration and CO2 Assimilation of a Soybean Chlorophyll Mutant," Crop Science, 1974, vol. 14, pp. 779-782 (abstract only).
Shikanai et al., "Identification and Characterization of *Arabidopsis* Mutants with Reduced Quenching of Chlorophyll Fluorescence," Plant and Cell Physiology, 1999, vol. 40, No. 11, pp. 1134-1142 (abstract only).
Anderson, "Algal Culturing Techniques," 2005, p. 208.
Ben-Amotz, Ami. "Large-Scale Open Algae Ponds," presented at the NREL-AFOSR Joint Workshop on Algal Oil for Get Fuel Production in Feb. 2008.
Ebeling et al., "Design and Operation of a Zero-Exchange Mixed-Cell Raceway Production System," 2nd Int'l Sustainable Marine Fish Culture Conference and Workshop, Oct. 2005.
Labatut et al., "Hydrodynamics of a Large-Scale Mixed-Cell Raceway (MCR): Experimental Studies," Aquacultural Engineering vol. 37, Issue 2, Sep. 2007, pp. 132-143.
Kizilisoley et al., "Micro-Algae Growth Technology Systems," Presented by Selim Helacioglu, Soley Institute, 2008.
Kent BioEnergy, "Fish Farm Empties Its Ponds to Grow Algae for Biofuels," Apr. 17, 2009 (http://www-csgc.ucsd.edu/newsroom/newsreleases/2009/algaeforbiofuls.html).

Hoyt et al., "Waves on Water Jets," J. Fluid Mech., 1977, vol. 83, Part 1, pp. 119-127.
Mitra et al., "Optical Properties of Microalgae for Enhanced Biofuels Production," Optics Express, Dec. 2008, vol. 16, No. 26.
Rodolphi et al., "Microalgae for Oil: Strain Selection, Induction of a Lipid Synthesis and Outdoor Mass Cultivation in a Low-Cost Photobioreactor," Biotechnology and Bioengineering, 2008, vol. 102, No. 1, pp. 100-112.
International Search Report mailed Sep. 16, 2009 for Application No. PCT/US2009/004296, filed Jul. 24, 2009.
Written Opinion of the International Searching Authority mailed Sep. 16, 2009 for Application No. PCT/US2009/004296, filed Jul. 24, 2009.
Office Action mailed Nov. 14, 2012 in China Patent Application No. 200980138072.X, filed Jul. 24, 2009.
Official Action mailed Jul. 10, 2012 in Mexico Patent Application No. MX/a/2011/000934, filed Jul. 24, 2009.
Official Action mailed Mar. 5, 2013 in Mexico Patent Application No. MX/a/2011/000934, filed Jul. 24, 2009.
Duarte et al., "Glyphosate (GP) Effects with Emphasis on Aquatic Organisms," Columbia Orinoquia, ISSN: 0121-3709, pp. 70-100, 2004.
Technical Card: Glyphosate, Document filed for the Pesticide Action Network and the Alternatives Thereof, for Latin America (RAP-AL)-Communications and Administration Office, Apr. 2008.
Department of Environment, Housing and Territorial Development Ministry, Resolution (1009), published Jun. 17, 2008.
International Search Report and Written Opinion of the International Searching Authority mailed May 3, 2010 for Application No. PCT/US2010/000346, filed Feb. 4, 2010.
Patent Examination Report No. 1 mailed Jan. 9, 2013 in Australia Patent Application 2010210982, filed Feb. 4, 2010.
First Office Action mailed Nov. 5, 2012 in China Patent Application No. 201080012755.3, filed Feb. 4, 2010.
Official Action mailed Sep. 17, 2012 in Mexico Patent Application No. MX/a/2011/008222, filed Feb. 4, 2010.
International Search Report and Written Opinion of the International Searching Authority mailed Aug. 30, 2010 for Application No. PCT/US2010/001731, filed Jun. 15, 2010.
Notice on the First Office Action mailed Dec. 14, 2012 in Chinese Application No. 201080036170.5 filed Jun. 15, 2010.
International Search Report and Written Opinion of the International Searching Authority mailed Aug. 19, 2010 for Application No. PCT/US2010/001755, filed Jun. 16, 2010.
International Search Report and Written Opinion of the International Searching Authority mailed Jul. 31, 2012 for Application No. PCT/US2012/035290, filed Apr. 26, 2012.
International Search Report and Written Opinion of the International Searching Authority mailed Jul. 30, 2010 for Application No. PCT/US2010/001315, filed May 4, 2010.
First Office Action mailed Oct. 25, 2012 in China Patent Application No. 201080027531.X, filed May 4, 2010.
Extended European Search Report mailed Oct. 5, 2012 in European Patent Application 10772376.9, filed on May 4, 2010.
Polle et al., "tla1, a DNA insertional transformant of the green alga *Chlamydomonas reinhardtii* with a truncated light-harvesting chlorophyll antenna size," Planta, vol. 217, No. 1, May 2003, pp. 49-59.
Lawrence et al., "Variation in Plants Regenerated from Vacuolate and Evacuolate Protoplasts," Plant Science, vol. 50, No. 2, 1987, pp. 125-132.
Beckmann et al., "Improvement of light to biomass conversion by de-regulation of light-harvesting protein translation in *Chlamydomonas reinhardtii*," Journal of Biotechnology, vol. 142, No. 1, 2009, pp. 70-77.
International Search Report and Written Opinion of the International Searching Authority mailed Aug. 16, 2012 for Application No. PCT/US2012/041425, filed Jun. 7, 2012.
European Search Report mailed Oct. 5, 2012 in European Patent Application No. 10772376.9, filed May 4, 2010.
Examination Report mailed Feb. 20, 2013 in Australian Application No. 2009274500 filed Jul. 24, 2009.
Notice on the Second Office Action mailed Jun. 20, 2013 in Chinese Application No. 201080012755.3 filed Feb. 4, 2010.

(56) References Cited

OTHER PUBLICATIONS

Notice on the Second Office Action mailed Jul. 5, 2013 in Chinese Application No. 201080027531.X filed May 4, 2010.
Examination Report mailed Aug. 22, 2013 in Australian Application No. 2010260530 filed Jun. 15, 2010.
First Office Action mailed Aug. 29, 2013 in Mexican Application No. MX/a/2011/013710 filed Jun. 15, 2010.
Examination Report mailed Aug. 29, 2013 in European Application No. 10772376.9 filed May 4, 2010.
Examination Report mailed Sep. 19, 2013 in Australian Application No. 2010245255 filed May 4, 2010.
Notice on the Second Office Action mailed Sep. 24, 2013 in Chinese Application No. 200980138072.X filed Jul. 24, 2009.
Zuo-Xi Ruan et al., Effects of Acute Glyphosate Exposure on the Growth and Physiology of *Nostoc Sphaeroides*, an Edible Cyanobacterium of Paddy Rice Fields, Acta Hydrobiologica Sinica, Jul. 2008 vol. 32, No. 4.
HCAPLUS abstract 1997; 248650 (1997).
HCAPLUS abstract 2005; 600349 (2005).
HCAPLUS abstract 2007; 1143765 (2007).
Notice on the Second Office Action mailed Oct. 24, 2013 in Chinese Application No. 201080036170.5 filed Jun. 15, 2010.
Tucker (Water Treatment, 1998, Springer, pp. 1-754).
Vinneras et al (The potential for disinfection of separated faecal matter by urea and by peracetic acid for hygienic nutrient recycling, 2003, Bioresources Technology, vol. 89, pp. 155-161).
CCAP website, f2 media recipe, 2005.
Palanichamy et al (Observations on the long term preservation and culture of the marine microalga, *Nannochloropsis oculata*, 2004, Journal of Marine Biology Association of India, vol. 46, pp. 98-103).
Office Action mailed Nov. 11, 2013 in Mexican Application No. MX/a/2011/000934 filed Jul. 24, 2009.
Ebeling et al., "Mixed-Cell Raceway: Engineering Design Criteria, Construction, and Hydraulic Characterization," North American Journal of Aquaculture, 2005, 67: 193-201 (abstract only).

\* cited by examiner

OPTIMIZATION OF CIRCULATION OF FLUID IN AN ALGAE CULTIVATION POND

CROSS REFERENCE TO RELATED APPLICATIONS

U.S. Non-Provisional patent application Ser. No. 12/485,862 filed on Jun. 16, 2009, titled "Systems, Methods, and Media for Circulating Fluid in an Algae Cultivation Pond" is hereby incorporated by reference.

FIELD OF INVENTION

The present invention relates generally to movement of fluid in an aquaculture, and more particularly to the optimization of circulation of fluid in an algae cultivation pond.

BRIEF SUMMARY OF THE INVENTION

Provided herein are exemplary algae cultivation ponds having the circulation of fluid optimized for such factors as decreased energy consumption, decreased predators/competitors, decreased or eliminated flow dead zones (i.e., stagnant regions), and increased algae biomass production, such as for the production of biofuels and other algae-based products.

An exemplary algae cultivation pond may comprise an expansion zone and a vane within the expansion zone. A first pond bottom may underlie the expansion zone. An exterior wall may form an angle with the first pond bottom of approximately ninety to greater than one-hundred-sixty degrees. A second pond bottom adjacent to the first pond bottom may have an approximately consistent ground elevation, approximately matching a lowermost ground elevation of the first pond bottom. Additionally, the second pond bottom may extend outward from the first pond bottom. The vane in the expansion zone may extend to a point above the second pond bottom.

In a further exemplary algae cultivation pond, a first contraction zone may be associated with a turning portion and a third pond bottom. The turning portion may have an interior portion and an exterior portion, wherein the exterior of the turning portion has a ground elevation above that of a ground elevation of the interior of the turning portion. A fourth pond bottom adjacent to the first contraction zone may extend outward from the first contraction zone. An exterior wall may form an approximately ninety degree angle with the fourth pond bottom, and have a ground elevation that gradually decreases as it extends outward from the exterior wall. Additionally, a fluid circulator may be located above the fourth pond bottom.

According to yet further exemplary embodiments, a fifth pond bottom adjacent to the fourth pond bottom may extend outward from the fourth pond bottom. An interior wall may form an approximately ninety degree angle with the fifth pond bottom, and have a ground elevation that gradually decreases as it extends outward from the interior wall. A sixth pond bottom adjacent to the fifth pond bottom, may have an approximately consistent ground elevation matching a lowermost ground elevation of the fifth pond bottom. The sixth pond bottom may extend outward from the fifth pond bottom.

DETAILED DESCRIPTION

Provided herein are exemplary algae cultivation ponds having the circulation of fluid optimized for such factors as decreased energy consumption, decreased predators/competitors, decreased or eliminated flow dead zones (i.e., stagnant regions), and increased algae biomass production, such as for the production of biofuels and other algae-based products.

Figure 1:
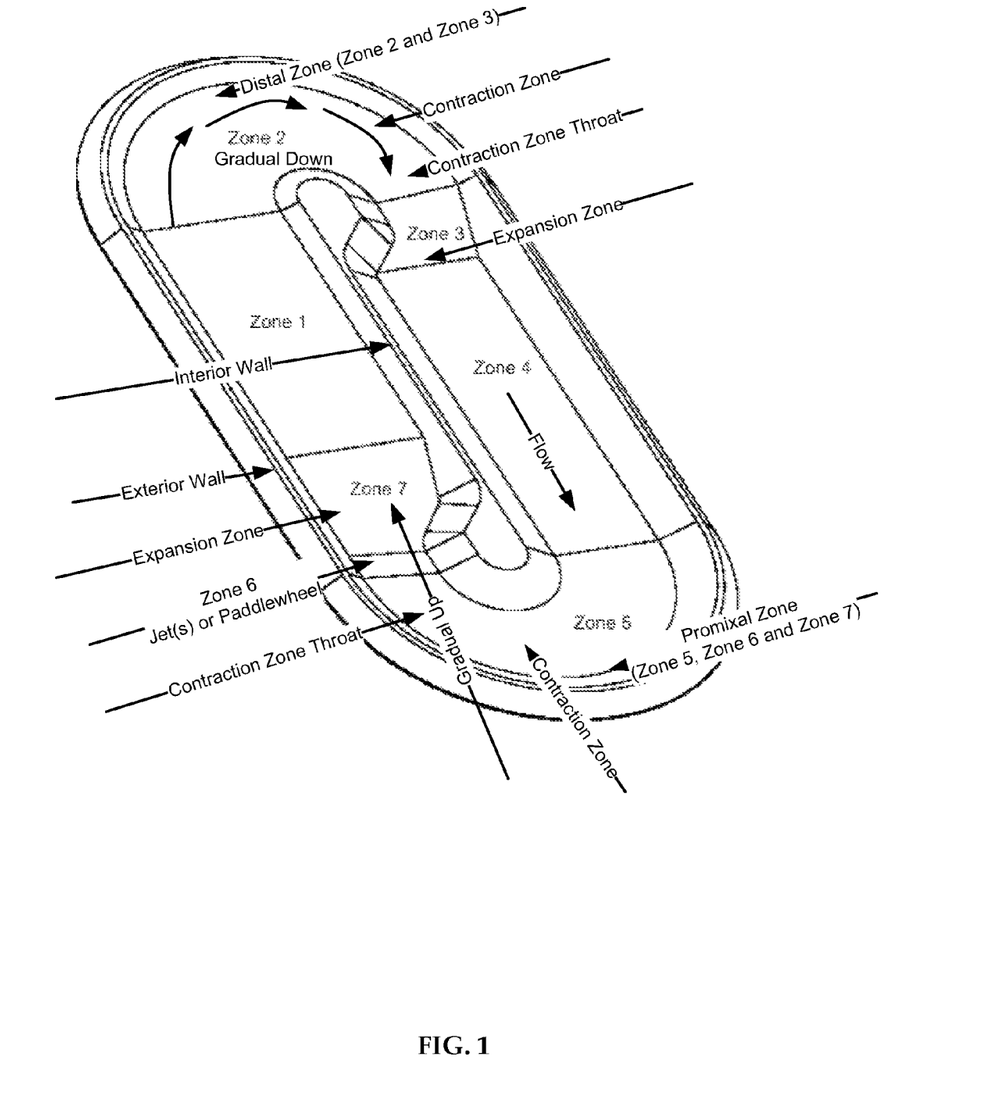
FIG. 1 illustrates an exemplary algae cultivation pond in accordance with embodiments of the present invention.

FIG. 1 illustrates an exemplary algae cultivation pond in accordance with various embodiments of the present invention. It should be noted that FIG. 1 is not drawn to any particular scale, and that scales of exemplary embodiments may vary from that shown in FIG. 1. Shown in FIG. 1 are zones 1 through 7, with an exterior wall and an interior wall on either side of each zone forming the exemplary algae cultivation pond. Also shown in FIG. 1 is the direction of the flow of the algae cultivation fluid in the algae cultivation pond, a distal zone or end having a first contraction zone and an expansion zone, and a promixal zone or end having a second contraction zone, an expansion zone, and a jet system or a paddlewheel ("fluid circulator"). Exemplary fluid circulators and fluid circulation systems may be found in U.S. Non-Provisional patent application Ser. No. 12/485,862, filed on Jun. 16, 2009, titled "Systems, Methods, and Media for Circulating Fluid in an Algae Cultivation Pond", which is hereby incorporated by reference.

Referring again to FIG. 1, some exemplary algae cultivation ponds may include a contraction zone, such as the exemplary first contraction zone illustrated within the distal end. In some exemplary embodiments, one or more curved guiding vanes may be placed within the first contraction zone (not shown).

According to some exemplary embodiments, guiding vanes may be made out of High Density Poly Ethylene (HDPE). According to other embodiments, vanes may be made out of any suitable material that can direct the flow of liquid. Alternatively, vanes may be made out of aluminum or any other flexible material. A frame for a vane may be built on a bottom of the algae cultivation pond, and the vane may be mounted to the frame.

For various exemplary embodiments, the design of vanes may be accomplished by conducting computational fluid dynamics ("CFD") or by experimenting with different configurations in actual ponds. Optimal vane design results in no or little flow separation in an algae cultivation pond, and/or uniform velocity downstream of the vanes where the flow from different sections between the vanes merge to a single channel flow. The number of vanes may vary, and may depend on channel width as well as the effective angle of divergence.

In some exemplary embodiments, the contraction zone may have a turning portion, with the turning portion having an interior portion and an exterior portion. The interior of the turning portion may have a ground elevation below that of a ground elevation of the exterior of the turning portion. In an alternative embodiment, the exterior of the turning portion may have a ground elevation that approximates a ground elevation of the interior of the turning portion.

Again, with respect to FIG. 1, zone 3 shows a first pond bottom adjacent to the first contraction zone. Both an exterior wall and an interior wall may each form an angle with the first pond bottom of approximately ninety to greater than one-hundred-thirty-five degrees, in some cases reaching greater than one-hundred-sixty degrees.

Zone 4 in FIG. 1 shows a second pond bottom adjacent to the first pond bottom. The second pond bottom may have an approximately consistent (or relatively flat) ground elevation. The ground elevation may approximately match a lowermost ground elevation of the first pond bottom at zone 3. The second pond bottom at zone 4 may generally extend outward from the first pond bottom at zone 3, and represent the deepest portion of the entire algae cultivation pond.

Because zone 4 is located a significant distance away from the jet(s) and/or the paddlewheel located at zone 6, the algae cultivation fluid in zone 4 may be shallower due to the accumulated head loss, when compared to the other zones of the algae cultivation pond. Thus, the algae in the algae cultivation fluid may face increased temperature and become less productive in terms of growth and biomass production. Accordingly, zone 4 compensates for this risk by being the deepest zone within the algae cultivation pond. Zone 4 also compensates for this risk by having a constant (i.e. relatively flat) depth.

As shown in FIG. 1, some exemplary algae cultivation ponds may comprise a second contraction zone associated with a third pond bottom, such as the contraction zone shown at or near the promixal end of zone 5. Additionally, such a second contraction zone may further comprise one or more curved vanes within the contraction zone (not shown). The second contraction zone may have a turning portion, with an interior portion and an exterior portion of the turning portion. The exterior of the turning portion may have a ground elevation above that of a ground elevation of the interior of the turning portion.

With respect to the first and/or the second contraction zones, the channel width at the bottom of the throat of the contraction zone is decreased when compared to the channel width at the bottom of the algae cultivation pond in the rest of the pond (notwithstanding a second throat of a second contraction zone). A measure of the amount of the flow contraction in the throat of the contraction zone may be determined by a factor that is called the contraction ratio ("CR"). The contraction ratio is defined as:

$$CR = \frac{W_0}{W_c}$$

where $W_0$ is the channel width at the pond bottom in zones 1 and 4, and $W_c$ is the width of the channel in zone 6 and/or the channel width at the intersection of channels 2 and 3 at the pond bottom. Based on various designs, the contraction ratio CR may vary between approximately 1.1 and 5.0. Additionally, the contraction ratio in the distal and promixal ends may be different.

Referring again to FIG. 1, various exemplary algae cultivation ponds may further comprise a fourth pond bottom adjacent to the second contraction zone, such as that shown by the fourth pond bottom of zone 6. The fourth pond bottom may generally extend outward from the second contraction zone. Both an exterior wall and an interior wall may each form an approximately ninety to greater than one-hundred-thirty-five degree angle (in some cases reaching an angle greater than one-hundred-sixty degrees) with the fourth pond bottom. Additionally, a fluid circulator may be located above the fourth pond bottom, such as that shown by the jet system or the paddlewheel within zone 6.

In some exemplary algae cultivation ponds, a fifth pond bottom may be adjacent to the fourth pond bottom. In FIG. 1, zone 7 represents the fifth pond bottom adjacent to the fourth pond bottom of zone 6. The fifth pond bottom may extend outward from the fourth pond bottom. Both an exterior wall and an interior wall may each form an approximately ninety to greater than one-hundred-thirty-five degree angle (in some cases reaching an angle greater than one-hundred-sixty degrees) with the fifth pond bottom.

Also shown in FIG. 1 is a sixth pond bottom at zone 1. According to various exemplary algae cultivation ponds, the sixth pond bottom may be adjacent to the fifth pond bottom at zone 7. The sixth pond bottom may have an approximately consistent (or relatively flat) ground elevation. The ground elevation may approximately match a lowermost ground elevation of the fifth pond bottom at zone 7. The sixth pond bottom may extend outward from the fifth pond bottom, until it connects at or near the region illustrated and described in connection with zone 2, which is associated with a seventh pond bottom.

FIGS. 2A-2D illustrate exemplary ground elevations for an algae cultivation pond, such as the exemplary algae cultivation pond described in the context of FIG. 1.

As shown in FIGS. 2A-2D, an arbitrary reference point is selected at or above an exterior wall. Dn represents a fixed depth from the arbitrary reference point, which in some embodiments may be in the range of approximately ten to seventy centimeters. $H_L$ represents a fixed depth that may be added to Dn. $H_L$ may be added to Dn at a point "A" (located at or near the bottom of the interior wall) and/or $H_L$ may be added to Dn (located at a point "B" at or near the bottom of the exterior wall). $H_L$ is calculated to approximately represent the compensation required for the total head loss in an algae cultivation pond and in some embodiments may be in the range of approximately one to twenty-five centimeters.

In general, pond head loss may be characterized as the sum of two different losses. The first loss, known as "Friction Loss", may be calculated based on what is known as the Manning equation:

$$\Delta h_f = \frac{n^2 U^2 l}{R_h^{4/3}}$$

where l is the total pond length, n is the Manning coefficient that depends on the pond surface quality, U is the average flow velocity in the pond, and $R_h$ is the pond hydraulic radius that depends on the wetted cross section of the pond. The second loss, known as one time losses or local head loss for such elements as U-turns, contractions and/or diverging sections is also dependent on the average flow velocity in the algae cultivation pond and can be calculated based on the relationships which can be found in the relevant literature. In many exemplary embodiments, a jet(s) and/or a paddlewheel(s) compensates for the total head loss in an algae cultivation pond. In other words, they generate $H_L$, which will be lost along the pond.

Figure 2A:
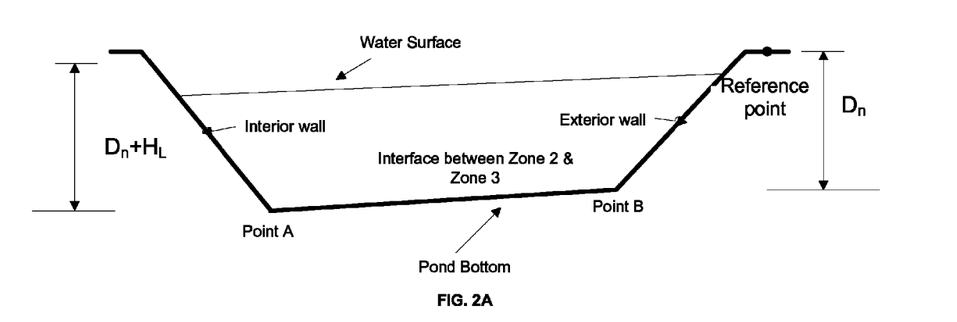
FIGS. 2A-2D illustrate exemplary ground elevations for an algae cultivation pond such as the exemplary algae cultivation pond described in the context of FIG. 1.

FIG. 2A shows an exemplary interface between zone 2 and zone 3. As shown in FIG. 2A, the water surface is relatively parallel to the pond bottom. At the same time, the pond bottom generally increases linearly or based on any other functions in ground elevation as it extends from point "A" to point "B".

Figure 2B:
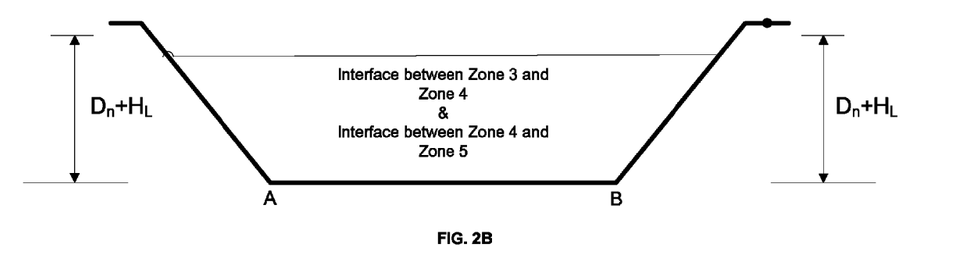

FIG. 2B shows an exemplary interface between zone 3 and zone 4. The same configuration may be observed as an exemplary interface between zone 4 and zone 5. As shown in FIG. 2B, the water surface is relatively horizontal. At the same time, the pond bottom generally remains flat in ground elevation as it extends from the interior wall at "A" to the exterior wall at "B". In other words, the pond bottom does not change along zone 4.

Because zone 4 is located a significant distance away from the jet(s) and/or from the paddlewheel illustrated in connection with zone 6, the algae cultivation fluid in zone 4 may be moving faster than the algae cultivation fluid located in other zones of the algae cultivation pond. Since zone 4 is located significantly downstream of the flow circulating system (e.g. jet system and/or paddlewheel), the accumulated head loss in this region is the largest. Therefore, if this zone was not deeper, the flow in this region would be shallower than the rest of the algae cultivation pond, and, thus, fastest. Accordingly, zone 4 compensates for this head loss by being the deepest zone within the algae cultivation pond. This is evidenced by $H_L$ being added to Dn at "A" at or near the bottom of the interior wall, and $H_L$ being added to Dn at "B" at or near the bottom of the exterior wall.

As FIGS. 2A-2B show, the bottom elevation in zone 3 changes from its intersection with zone 2, as shown in FIG. 2A, to its intersection with zone 4, as shown in FIG. 2B. This change in elevation of point "B" along zone 3 may be linear, abrupt, or based on any arbitrary function.

Figure 2C:
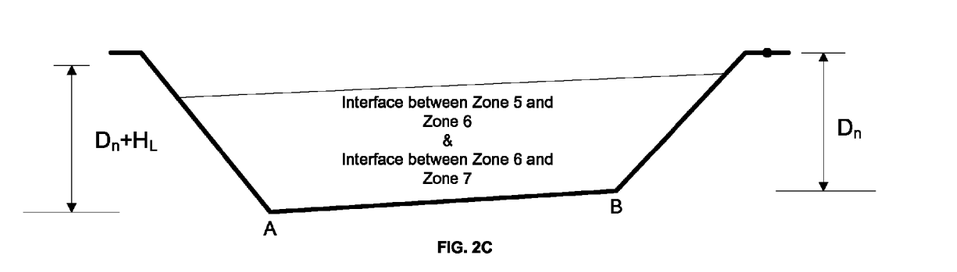

FIG. 2C shows an exemplary interface between zone 5 and zone 6. The same configuration may be observed as an exemplary interface between zone 6 and zone 7, which shows that the shape of the pond bottom does not change in zone 6. As shown in FIG. 2C, the water surface is relatively parallel to the pond bottom. At the same time, the pond bottom generally increases, linearly or based on any functions, in elevation as it extends from "A" at or near the bottom of the interior wall to "B" at or near the bottom of the exterior wall.

As FIGS. 2B and 2C show, the shape of the pond bottom in zone 5 changes from a flat shape to an uneven shape along the intersection of zone 5 with zone 6. The change of pond bottom and, thus, elevation of point "B" along zone 5 may be linear, abrupt, or may be based on any arbitrary function.

Figure 2D:
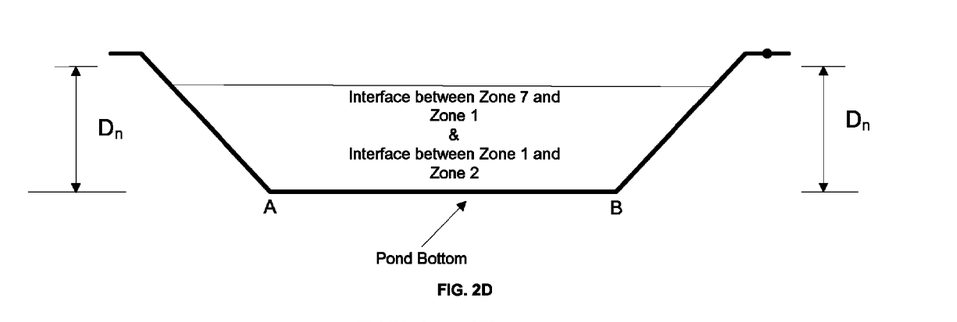
Figure 3:
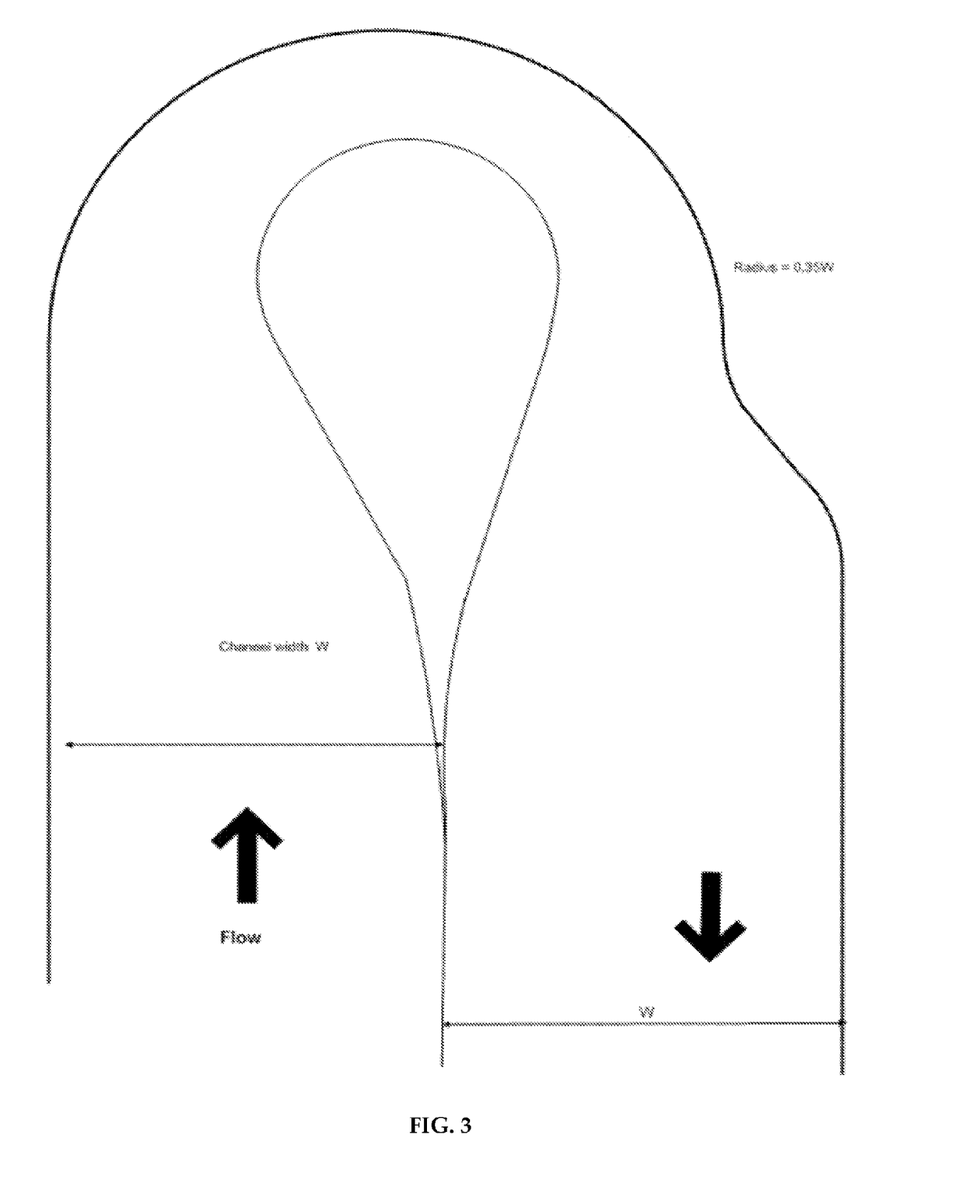
FIGS. 3-11 illustrate various exemplary configurations for algae cultivation ponds, such as for the exemplary algae cultivation ponds described in the context of FIG. 1 and FIGS. 2A-2D.
Figure 4:
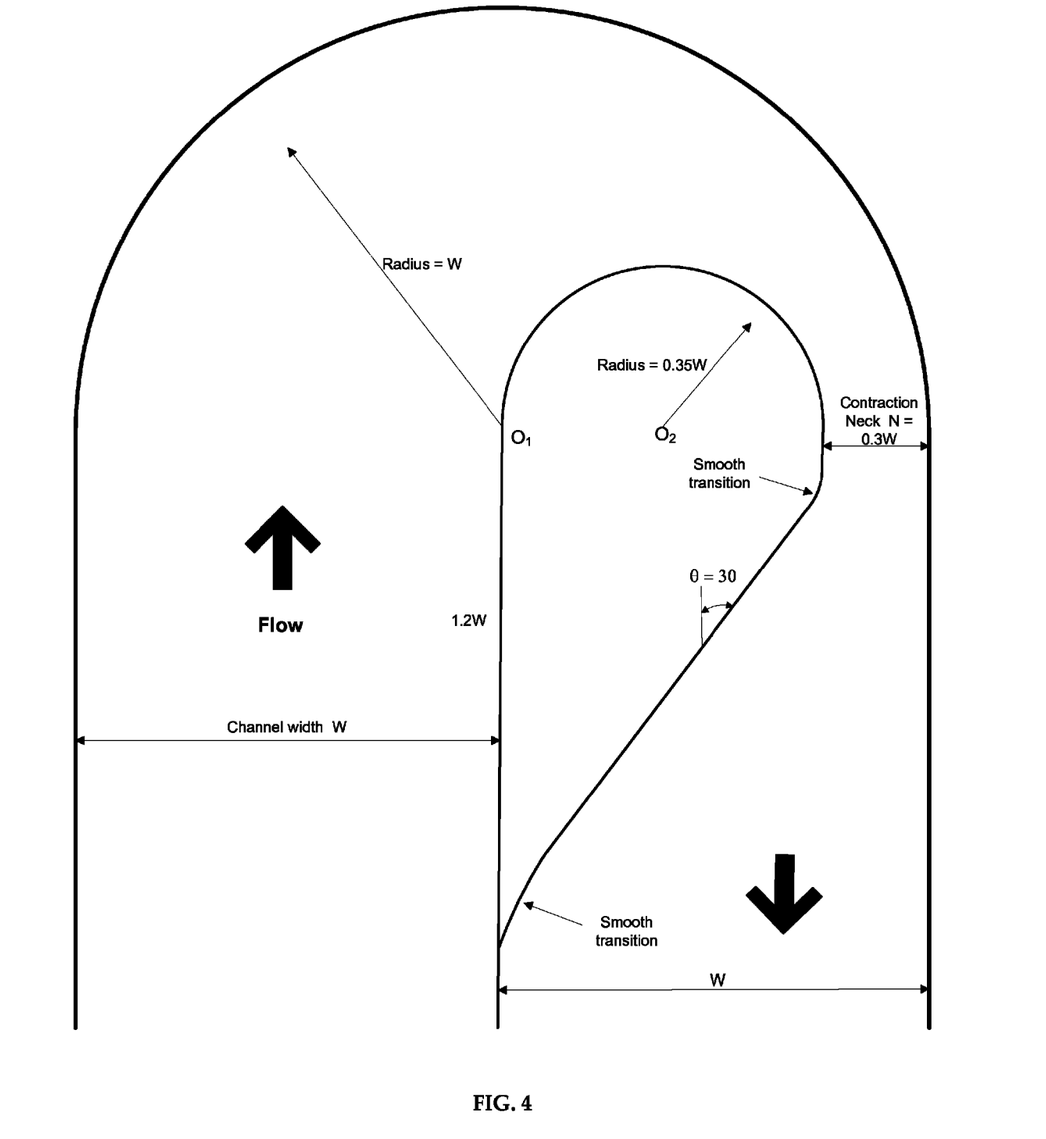

FIG. 2D shows an exemplary interface between zone 7 and zone 1. The same configuration may be observed as an exemplary interface between zone 1 and zone 2, which shows that the shape of the pond bottom does not change in zone 1. As shown in FIG. 2D, the water surface is relatively horizontal. At the same time, the pond bottom generally remains flat in elevation as it extends from "A" at or near the bottom of the interior wall to "B" at or near the bottom of the exterior wall. Because zone 1 is located immediately downstream of the pond flow circulating system (e.g. jets and/or paddlewheel) located at zone 6, due to the relatively short distance that the algae cultivation fluid has moved, the accumulated head loss in this zone is relatively low. Accordingly, zone 1 does not need to compensate for this relatively little head loss by being the shallowest zone within the algae cultivation pond. This is evidenced by $H_L$ not being added to Dn at "A" at or near the bottom of the interior wall, and $H_L$ not being added to Dn at "B" at or near the bottom of the exterior wall.

As FIGS. 2C and 2D show, the shape of the pond along zone 7 changes from the shape at its intersection with zone 6 to the shape at its intersection with zone 1. The change in the elevation of point "B" along zone 7 may be made linearly, abrupt, or based on any arbitrary function.

FIGS. 3-11 illustrate various exemplary configurations for algae cultivation ponds, such as for the exemplary algae cultivation ponds described in the context of FIG. 1 and FIGS. 2A-2D.

Various embodiments of the present invention are illustrated by the accompanying figures. It will be understood that the figures are not necessarily to scale and that details (e.g., dimensions) not necessary for an understanding of the invention or that render other details difficult to perceive may be omitted. It will be understood that the invention is not necessarily limited to the particular embodiments illustrated herein.

In exemplary embodiments, an algae cultivation pond may include both a promixal end and a distal end. In further embodiments, a fluid circulator may be applied to a distal end of an algae cultivation pond to create an induced flow in the pond. In other cases, an algae cultivation pond may not have a distal end, since one or more jets and/or one or more paddlewheels are installed in both ends of the algae cultivation pond, which means that both ends are considered to be promixal ends of the algae cultivation pond. Regardless of the case, it is generally desirable to maintain the flow of algae cultivation fluid in an energy efficient fashion, so as to minimize the formation of dead zones, where algae may sediment in the bottom of the algae cultivation pond.

Figure 5:
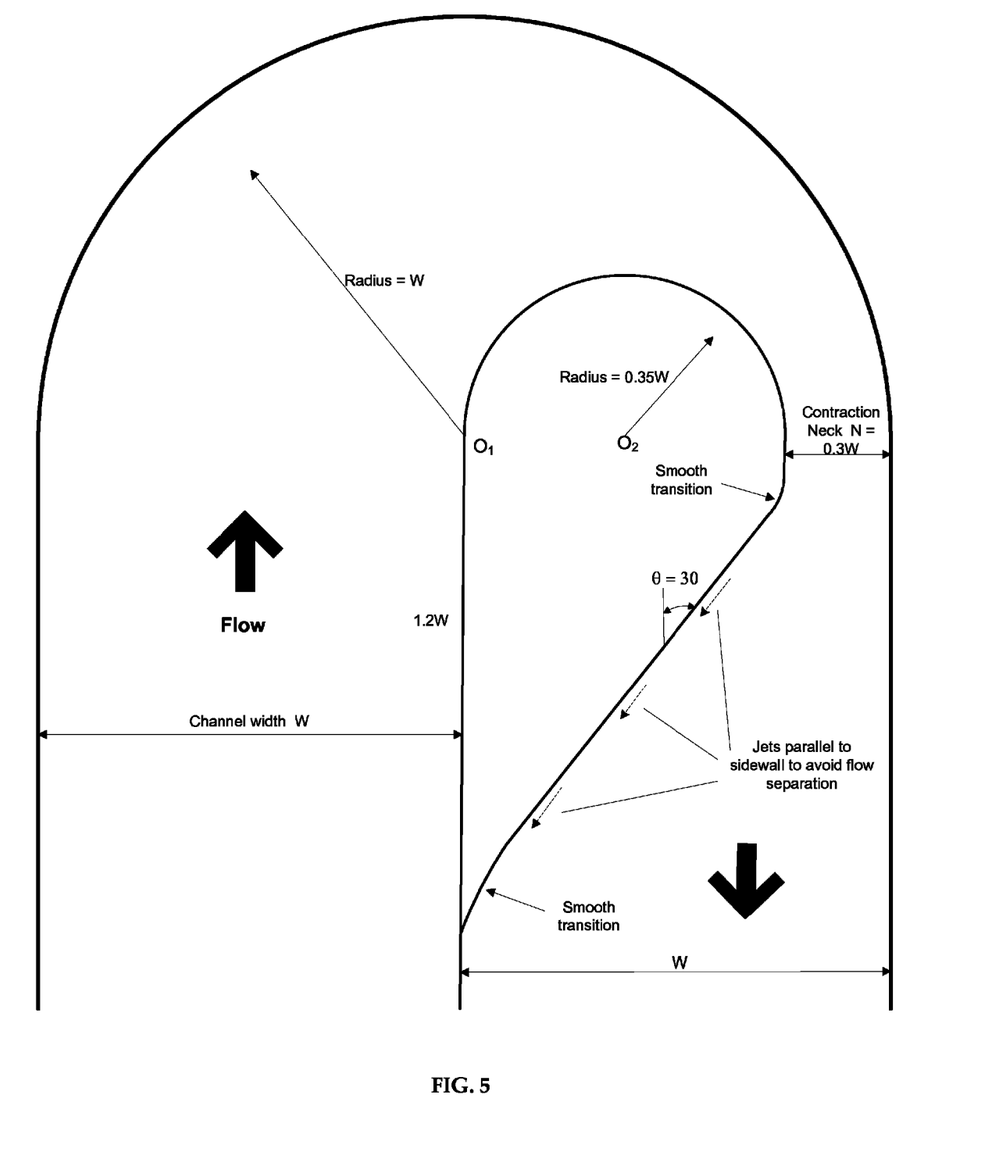

FIG. 5 shows an exemplary configuration for an algae cultivation pond. In particular, FIG. 5 shows a configuration similar to the configuration shown in FIG. 4, with FIG. 5 including the placement of jets issued from submerged nozzles parallel to the sidewall in order to avoid flow separation along the walls.

Figure 6:
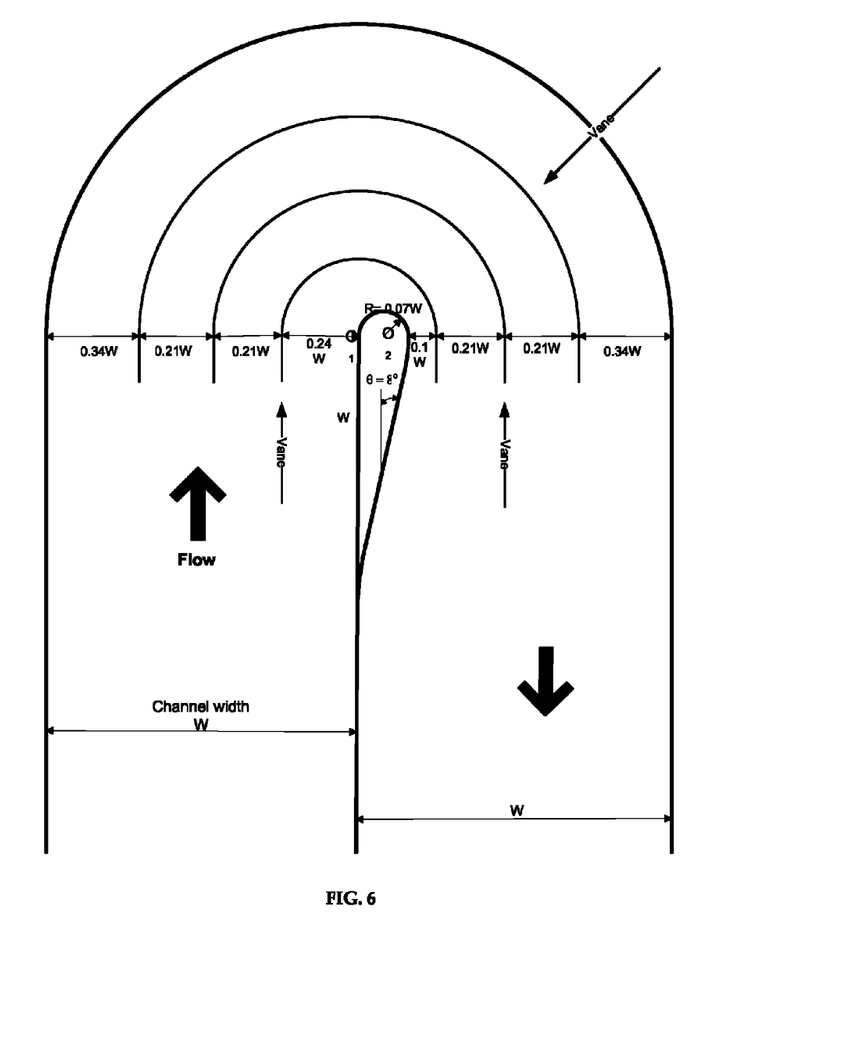

FIG. 6 shows another exemplary configuration for an algae cultivation pond. In particular, FIG. 6 shows the placement of vanes within a turning portion of an algae cultivation pond.

In general, separation of a flow boundary layer from a pond wall may lead to the increased generation of undesired dead zones. Flow separation may be increased by such factors as algae cultivation fluid flowing through a turning portion of an algae cultivation pond and/or algae cultivation fluid flowing through an expanding region (e.g. expanding in width) of an algae cultivation pond. As the algal fluid flows out of such parts of the algae cultivation pond, it becomes detached or separated from a side of the algae cultivation pond. Vane placement counters this tendency for flow separation, by decreasing the effective divergence angle. Such attachment increases the efficiency of the flow of algae cultivation fluid in an algae cultivation pond, and decreases the energy required (e.g. placement of extra nozzles) to maintain circulation within the algae cultivation pond.

Figure 7:
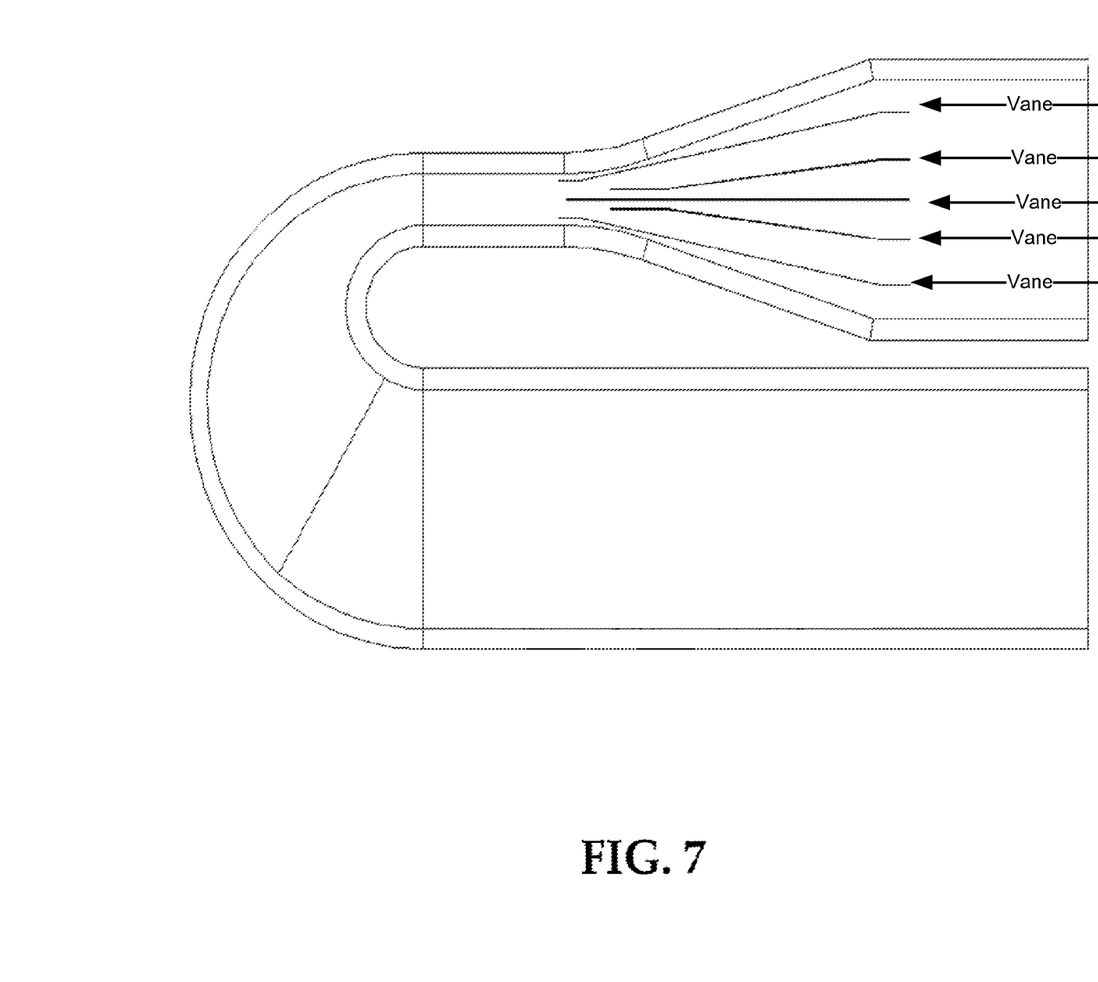
Figure 8:
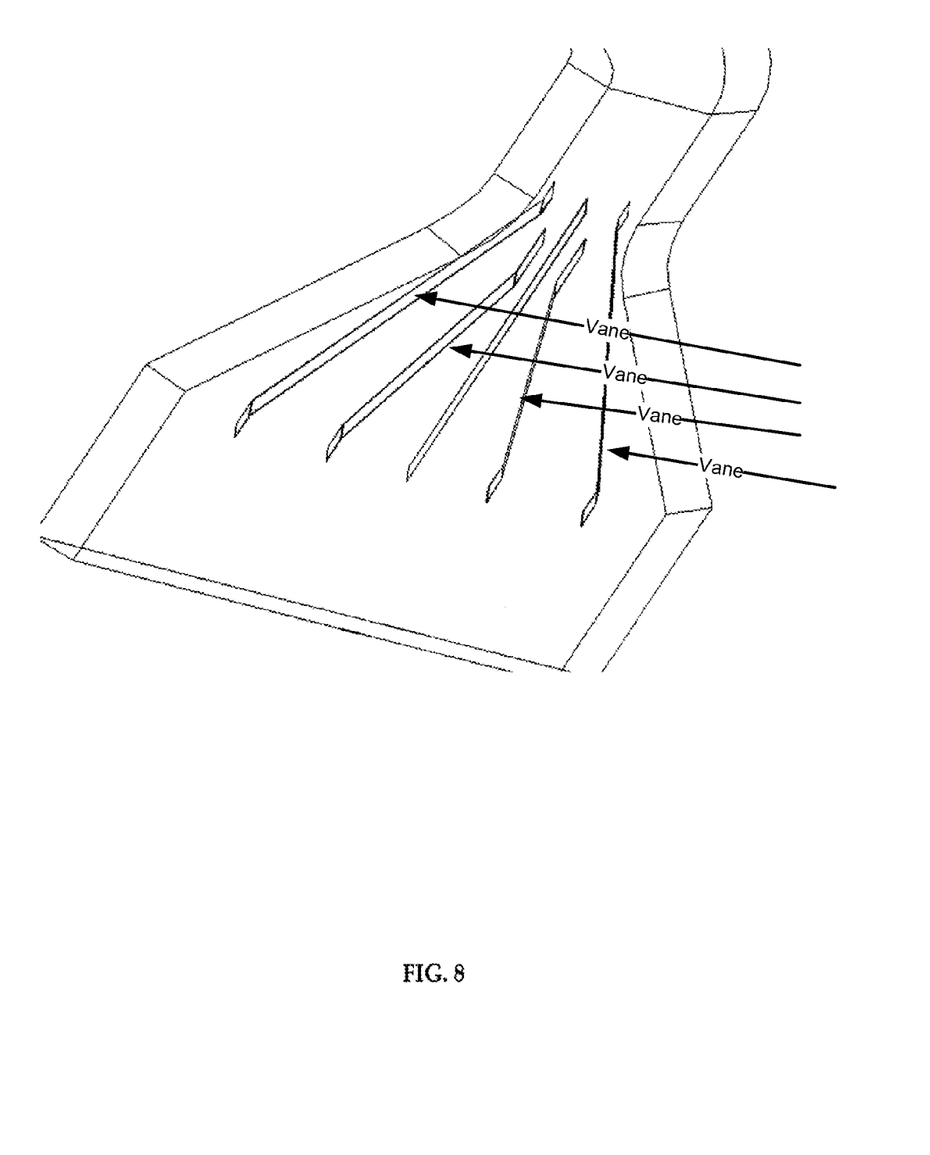
Figure 9:
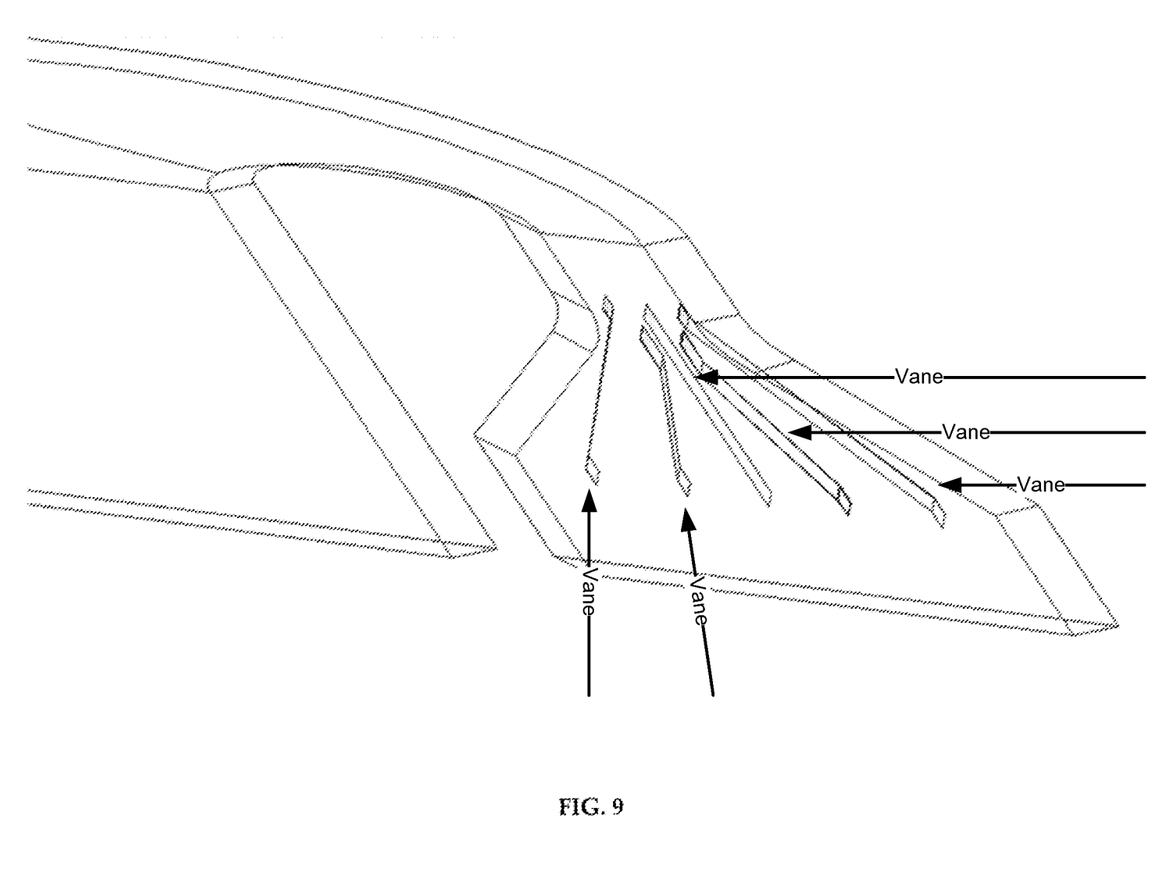

FIGS. 7-9 show another exemplary configuration of an algae cultivation pond. In particular, FIGS. 7-9 show the placement of vanes just outside of a turning portion (i.e. throat) of an algae cultivation pond, where the pond expands and the flow diverges and the tendency for separation of the flow of the algal fluid from the sides of the pond increases. Vane placement counters this tendency for flow separation, by decreasing the divergence angle in the expansion zones.

Figure 10:
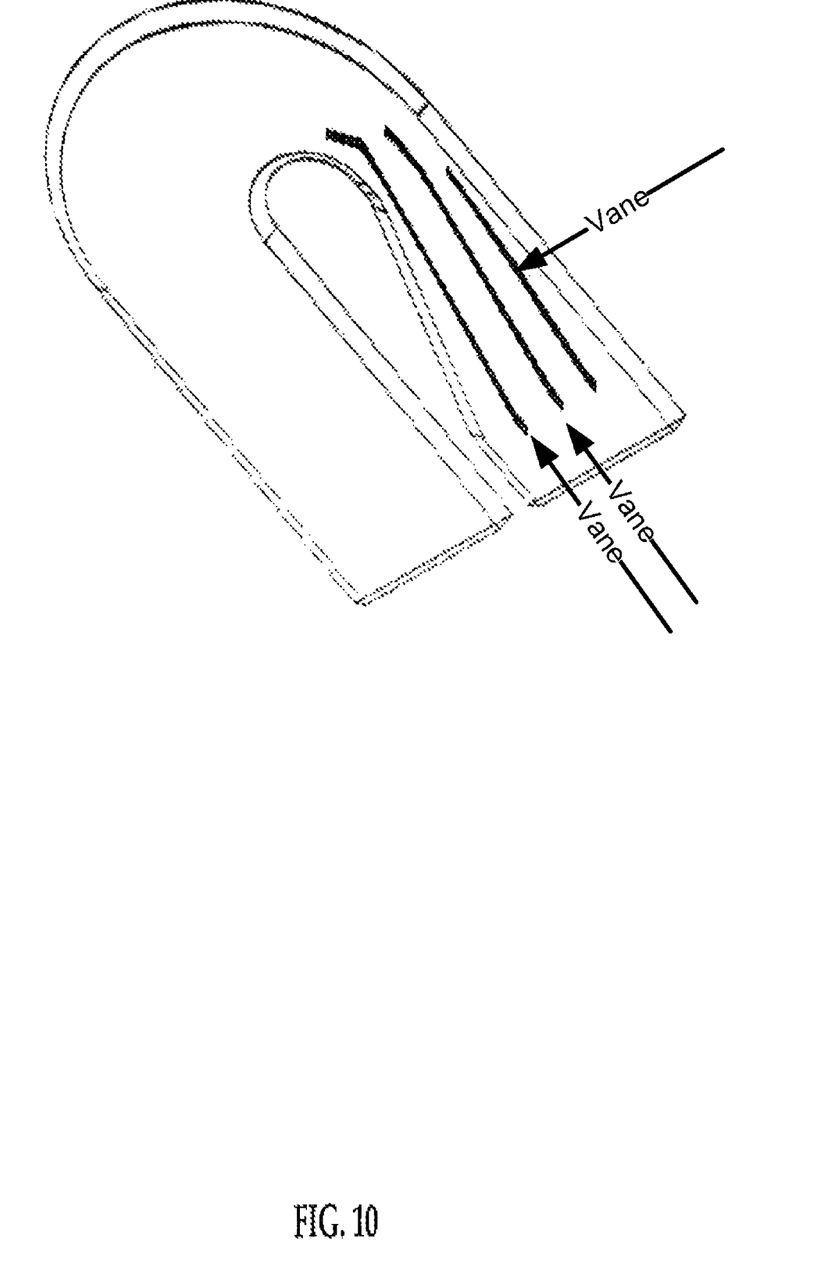
Figure 11:
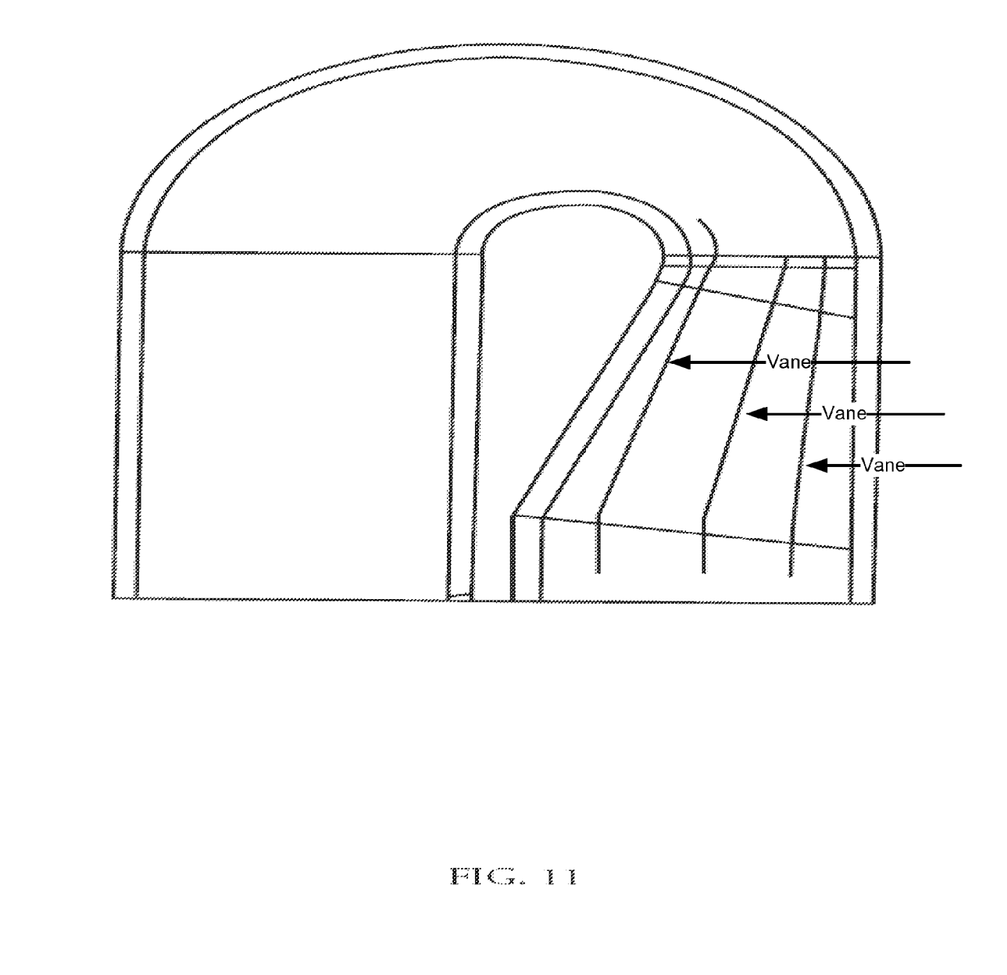

FIGS. 10-11 show another exemplary configuration of an algae cultivation pond. In particular, FIGS. 10-11 show the placement of vanes just inside and just outside of a turning portion (i.e. throat) of an algae cultivation pond. Again, vane placement counters the tendency for flow separation, by decreasing the divergence angle in each compartment built by the vanes.

Upon reading this, it will become apparent to one skilled in the art that various modifications may be made to the algae cultivation ponds disclosed herein without departing from the scope of the disclosure. As such, this disclosure is not to be interpreted in a limiting sense but as a basis for support of the appended claims.

The invention claimed is:

1. An algae cultivation pond comprising:
   an expansion zone; and
   a plurality of vanes within the expansion zone, the plurality of vanes positioned lengthwise from a throat of the algae cultivation pond to at least a fully expanded point in the expansion zone of the algae cultivation pond, with a horizontal distance between each vane progressively increasing from the throat of the algae cultivation pond to the fully expanded point in the expansion zone.

2. The algae cultivation pond of claim 1, further comprising:
   a first pond bottom underlying the expansion zone.

3. The algae cultivation pond of claim 2, further comprising:
   an exterior wall, the exterior wall forming an angle with the first pond bottom of approximately ninety to greater than one-hundred-sixty degrees.

4. The algae cultivation pond of claim 3, further comprising:
   a second pond bottom adjacent to the first pond bottom, the second pond bottom having an approximately consistent ground elevation, the ground elevation approximately matching a lowermost ground elevation of the first pond bottom, and the second pond bottom extending outward from the first pond bottom.

5. The algae cultivation pond of claim 4, wherein the vane in the expansion zone extends to a point above the second pond bottom.

6. The algae cultivation pond of claim 5, further comprising:
   a first contraction zone associated with a turning portion and a third pond bottom, the turning portion having an interior portion of the pond bottom and an exterior portion of the pond bottom, wherein the exterior portion of the pond bottom of the turning portion has a ground elevation above that of a ground elevation of the interior portion of the pond bottom of the turning portion.

7. The algae cultivation pond of claim 6, further comprising:
   a fourth pond bottom adjacent to the first contraction zone, the fourth pond bottom extending outward from the first contraction zone;
   an exterior wall, the exterior wall forming an approximately ninety degree angle with the fourth pond bottom, the exterior wall having a ground elevation that gradually decreases as it extends outward from the exterior wall; and
   a fluid circulator above the fourth pond bottom.

8. The algae cultivation pond of claim 7, further comprising:
   a fifth pond bottom adjacent to the fourth pond bottom, the fifth pond bottom extending outward from the fourth pond bottom;
   an interior wall, the interior wall forming an approximately ninety degree angle with the fifth pond bottom, the interior wall having a ground elevation that gradually decreases as it extends outward from the interior wall.

9. The algae cultivation pond of claim 7, wherein the fluid circulator is a jet.

10. The algae cultivation pond of claim 7, wherein the fluid circulator is a paddle wheel.

11. The algae cultivation pond of claim 8, further comprising:
    a sixth pond bottom adjacent to the fifth pond bottom, the sixth pond bottom having an approximately consistent ground elevation, the ground elevation approximately matching a lowermost ground elevation of the fifth pond bottom, and the sixth pond bottom extending outward from the fifth pond bottom.

12. The algae cultivation pond of claim 6, wherein the turning portion approximates a "U" configuration.

13. The algae cultivation pond of claim 12, further comprising:
    at least one vane placed within the "U" configuration.

14. The algae cultivation pond of claim 13, wherein the vane is configured to approximate a shape of the "U" configuration.

15. The algae cultivation pond of claim 6, wherein the first contraction zone has a neck or a throat.

16. The algae cultivation pond of claim 6, wherein the first contraction zone has a width.

17. The algae cultivation pond of claim 16, wherein the width increases after the neck or the throat of the contraction zone.

18. The algae cultivation pond of claim 17, wherein a pond bottom elevation increases as the width increases.

19. The algae cultivation pond of claim 1, wherein the pond is in a raceway configuration.

20. The algae cultivation pond of claim 1, wherein the pond is in a serpentine configuration.

* * * * *